US 8,893,256 B2

(12) United States Patent
Szeto et al.

(10) Patent No.: US 8,893,256 B2
(45) Date of Patent: *Nov. 18, 2014

(54) SYSTEM AND METHOD FOR PROTECTING CPU AGAINST REMOTE ACCESS ATTACKS

(75) Inventors: Ronald W. Szeto, Pleasanton, CA (US);
Philip Kwan, San Jose, CA (US);
Raymond Wai-Kit Kwong, Los Altos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/827,235

(22) Filed: Jun. 30, 2010

(65) Prior Publication Data
US 2010/0333191 A1    Dec. 30, 2010

Related U.S. Application Data

(63) Continuation of application No. 10/668,455, filed on Sep. 23, 2003, now Pat. No. 7,774,833.

(51) Int. Cl.
*H04L 29/06*        (2006.01)

(52) U.S. Cl.
CPC .................. *H04L 63/0236* (2013.01)
USPC ........ 726/13; 726/3; 726/4; 726/14; 713/154; 713/162

(58) Field of Classification Search
USPC ..................... 713/160, 162; 726/15
See application file for complete search history.

(56) References Cited

U.S. PATENT DOCUMENTS

| 4,897,874 A | 1/1990 | Lidinsky et al. |
| 5,237,614 A | 8/1993 | Weiss |
| 5,721,780 A | 2/1998 | Ensor et al. |
| 5,757,924 A | 5/1998 | Friedman et al. |
| 5,774,551 A | 6/1998 | Wu et al. |
| 5,812,819 A | 9/1998 | Rodwin et al. |
| 5,825,890 A | 10/1998 | Elgamal et al. |
| 5,835,720 A | 11/1998 | Nelson et al. |
| 5,892,903 A | 4/1999 | Klaus |
| 5,894,479 A | 4/1999 | Mohammed |
| 5,946,308 A | 8/1999 | Dobbins et al. |
| 5,951,651 A * | 9/1999 | Lakshman et al. ............ 709/239 |

(Continued)

OTHER PUBLICATIONS

Notice of Allowance for U.S. Appl. No. 12/392,398, mailed on Apr. 29, 2011, 12 pages.

(Continued)

*Primary Examiner* — Minh Dinh
(74) *Attorney, Agent, or Firm* — Fountainhead Law Group, PC

(57) ABSTRACT

A system and method that provides for protection of a CPU of a router, by establishing a management port on a router. Hosts which are connected to a non-management ports of the router are denied access to management functions of a CPU of the router. The system and method can utilize an application specific integrated circuit, in conjunction with a CAM-ACL, which analyzes data packets received on the ports of router, and the ASIC operates to drop data packets which are directed to the CPU of the router. This system and method operates to filter data packets which may be generated in attempts to hack in to control functions of a network device, and the operation does not require that the CPU analyze all received data packets in connection with determining access to the control functions of the router.

15 Claims, 3 Drawing Sheets

(56) References Cited

U.S. PATENT DOCUMENTS

| | | | |
|---|---|---|---|
| 5,958,053 A | 9/1999 | Denker | |
| 5,974,463 A | 10/1999 | Warrier et al. | |
| 6,009,103 A | 12/1999 | Woundy | |
| 6,021,495 A | 2/2000 | Jain et al. | |
| 6,115,376 A | 9/2000 | Sherer et al. | |
| 6,167,052 A | 12/2000 | McNeill et al. | |
| 6,167,445 A | 12/2000 | Gai et al. | |
| 6,212,191 B1 | 4/2001 | Alexander et al. | |
| 6,219,790 B1 | 4/2001 | Lloyd et al. | |
| 6,256,314 B1 | 7/2001 | Rodrig et al. | |
| 6,338,089 B1 | 1/2002 | Quinlan | |
| 6,339,830 B1 | 1/2002 | See et al. | |
| 6,363,489 B1 | 3/2002 | Comay et al. | |
| 6,393,484 B1 | 5/2002 | Massarani | |
| 6,496,502 B1 | 12/2002 | Fite et al. | |
| 6,510,236 B1 | 1/2003 | Crane et al. | |
| 6,519,646 B1 | 2/2003 | Gupta et al. | |
| 6,553,028 B1 | 4/2003 | Tang et al. | |
| 6,615,264 B1 | 9/2003 | Stoltz et al. | |
| 6,651,168 B1 | 11/2003 | Kao | |
| 6,728,246 B1 | 4/2004 | Egbert et al. | |
| 6,732,270 B1 | 5/2004 | Patzer et al. | |
| 6,751,728 B1 | 6/2004 | Gunter et al. | |
| 6,771,649 B1 | 8/2004 | Tripunitara et al. | |
| 6,775,290 B1 | 8/2004 | Merchant et al. | |
| 6,789,118 B1 | 9/2004 | Rao | |
| 6,807,179 B1 | 10/2004 | Kanuri et al. | |
| 6,813,347 B2 | 11/2004 | Baals et al. | |
| 6,853,988 B1 | 2/2005 | Dickinson et al. | |
| 6,874,090 B2 | 3/2005 | See et al. | |
| 6,892,309 B2 | 5/2005 | Richmond et al. | |
| 6,907,470 B2 | 6/2005 | Sawada et al. | |
| 6,912,592 B2 | 6/2005 | Yip | |
| 6,950,628 B1 | 9/2005 | Meier et al. | |
| 6,959,336 B2 | 10/2005 | Moreh et al. | |
| 6,980,515 B1 | 12/2005 | Schunk et al. | |
| 6,981,054 B1 | 12/2005 | Krishna | |
| 7,028,098 B2 | 4/2006 | Mate et al. | |
| 7,032,241 B1 | 4/2006 | Venkatachary et al. | |
| 7,062,566 B2 | 6/2006 | Amara et al. | |
| 7,079,537 B1 | 7/2006 | Kanuri et al. | |
| 7,088,689 B2 | 8/2006 | Lee et al. | |
| 7,093,280 B2 | 8/2006 | Ke et al. | |
| 7,113,479 B2 | 9/2006 | Wong | |
| 7,131,141 B1 | 10/2006 | Blewett et al. | |
| 7,134,012 B2 | 11/2006 | Doyle et al. | |
| 7,188,364 B2 | 3/2007 | Volpano | |
| 7,194,554 B1 | 3/2007 | Short et al. | |
| 7,215,637 B1 * | 5/2007 | Ferguson et al. | 370/230.1 |
| 7,234,163 B1 | 6/2007 | Rayes et al. | |
| 7,249,374 B1 | 7/2007 | Lear et al. | |
| 7,343,441 B1 | 3/2008 | Chrysanthakopoulos et al. | |
| 7,360,086 B1 | 4/2008 | Tsuchiya et al. | |
| 7,360,245 B1 | 4/2008 | Ramachandran et al. | |
| 7,483,971 B2 | 1/2009 | Sylvest et al. | |
| 7,490,351 B1 | 2/2009 | Caves et al. | |
| 7,502,926 B2 | 3/2009 | Luo et al. | |
| 7,516,487 B1 | 4/2009 | Szeto et al. | |
| 7,523,485 B1 | 4/2009 | Kwan | |
| 7,529,933 B2 | 5/2009 | Palekar | |
| 7,536,464 B1 | 5/2009 | Dommety et al. | |
| 7,562,390 B1 | 7/2009 | Kwan | |
| 7,567,510 B2 | 7/2009 | Gai et al. | |
| 7,587,750 B2 | 9/2009 | Zimmer et al. | |
| 7,596,693 B1 | 9/2009 | Caves et al. | |
| 7,624,431 B2 | 11/2009 | Cox et al. | |
| 7,735,114 B2 | 6/2010 | Kwan et al. | |
| 7,752,320 B2 | 7/2010 | Kappes et al. | |
| 7,774,833 B2 | 8/2010 | Szeto et al. | |
| 7,876,772 B2 | 1/2011 | Kwan | |
| 7,921,290 B2 | 4/2011 | Albert et al. | |
| 7,979,903 B2 | 7/2011 | Kwan | |
| 8,006,304 B2 | 8/2011 | Kwan | |
| 2001/0012296 A1 | 8/2001 | Burgess et al. | |
| 2002/0016858 A1 | 2/2002 | Sawada | |
| 2002/0055980 A1 | 5/2002 | Goddard | |
| 2002/0065938 A1 | 5/2002 | Jungck et al. | |
| 2002/0133534 A1 | 9/2002 | Forslow | |
| 2002/0146002 A1 | 10/2002 | Sato | |
| 2002/0146107 A1 | 10/2002 | Baals et al. | |
| 2002/0165956 A1 | 11/2002 | Phaal | |
| 2003/0028808 A1 | 2/2003 | Kameda | |
| 2003/0037163 A1 | 2/2003 | Kitada et al. | |
| 2003/0043763 A1 | 3/2003 | Grayson | |
| 2003/0051041 A1 | 3/2003 | Kalavade et al. | |
| 2003/0056001 A1 | 3/2003 | Mate et al. | |
| 2003/0056063 A1 | 3/2003 | Hochmuth et al. | |
| 2003/0056096 A1 | 3/2003 | Albert et al. | |
| 2003/0065944 A1 | 4/2003 | Mao et al. | |
| 2003/0067874 A1 | 4/2003 | See et al. | |
| 2003/0105881 A1 | 6/2003 | Symons et al. | |
| 2003/0142680 A1 | 7/2003 | Oguchi | |
| 2003/0165160 A1 | 9/2003 | Minami et al. | |
| 2003/0167411 A1 | 9/2003 | Maekawa | |
| 2003/0169713 A1 | 9/2003 | Luo et al. | |
| 2003/0177350 A1 | 9/2003 | Lee | |
| 2003/0188003 A1 | 10/2003 | Sylvest et al. | |
| 2003/0217151 A1 | 11/2003 | Roese et al. | |
| 2003/0226017 A1 | 12/2003 | Palekar et al. | |
| 2003/0236898 A1 | 12/2003 | Hu et al. | |
| 2004/0003285 A1 | 1/2004 | Whelan et al. | |
| 2004/0053601 A1 | 3/2004 | Frank et al. | |
| 2004/0078485 A1 | 4/2004 | Narayanan | |
| 2004/0098588 A1 | 5/2004 | Ohba et al. | |
| 2004/0160903 A1 | 8/2004 | Gai et al. | |
| 2004/0172559 A1 | 9/2004 | Luo et al. | |
| 2004/0177276 A1 | 9/2004 | Mackinnon et al. | |
| 2004/0210663 A1 | 10/2004 | Phillips et al. | |
| 2004/0213172 A1 | 10/2004 | Myers et al. | |
| 2004/0213260 A1 | 10/2004 | Leung et al. | |
| 2004/0255154 A1 | 12/2004 | Kwan et al. | |
| 2004/0268140 A1 | 12/2004 | Zimmer et al. | |
| 2005/0021979 A1 | 1/2005 | Wiedmann et al. | |
| 2005/0080921 A1 | 4/2005 | Lu | |
| 2005/0091313 A1 | 4/2005 | Zhou et al. | |
| 2005/0111466 A1 | 5/2005 | Kappes et al. | |
| 2005/0125692 A1 | 6/2005 | Cox et al. | |
| 2005/0185626 A1 | 8/2005 | Meier et al. | |
| 2005/0254474 A1 | 11/2005 | Iyer et al. | |
| 2006/0028996 A1 | 2/2006 | Huegen et al. | |
| 2006/0070122 A1 | 3/2006 | Bellovin | |
| 2006/0155853 A1 | 7/2006 | Nesz et al. | |
| 2007/0220596 A1 | 9/2007 | Keeler et al. | |
| 2009/0254973 A1 | 10/2009 | Kwan et al. | |
| 2009/0260083 A1 | 10/2009 | Szeto | |
| 2009/0265785 A1 | 10/2009 | Kwan et al. | |
| 2009/0307773 A1 | 12/2009 | Kwan et al. | |
| 2010/0223654 A1 | 9/2010 | Kwan et al. | |
| 2010/0325700 A1 | 12/2010 | Kwan | |
| 2012/0011584 A1 | 1/2012 | Kwan | |

OTHER PUBLICATIONS

Requirement for Restriction/Election for U.S. Appl. No. 12/392,422, mailed on Apr. 14, 2011, 5 pages.

Notice of Allowance for U.S. Appl. No. 12/478,216, mailed on May 5, 2011, 9 pages.

Non-Final Office Action for U.S. Appl. No. 10/458,628, mailed on Apr. 28, 2011, 23 pages.

Civil Action CV10-03428—First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 237 pages, with Exhibits A through P.

Civil Action CV10-03428—Defendant, David Cheung's Answer to Plaintiff's First Amended Complaint, filed Nov. 11, 2010, 32 pages.

Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage,

(56) References Cited

OTHER PUBLICATIONS

Inference with Contract, and Unfair Competition Under Cal. Bus. & Prof. Code §§ 17200 et seq., Filed Apr. 13, 2011, 238 pages, with Exhibits A through P.
Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 29, 2011, 318 pages, with Exhibits A through T.
Civil Action CV10-03428—A10 Networks, Inc.'s, Lee Chen's, Rajkumar Jalan's, Ron Szeto's, Liang Han's, and Steve Hwang's Answer to Third Amended Complaint, Affirmative Defenses, and A10's Counterclaims, Filed May 16, 2011, 40 pages.
Civil Action CV10-03428—Plaintiffs and Counterclaim Defendants Brocade Communications Systems, Inc. and Foundry Networks, LLC's Answer to Defendant A10 Networks, Inc.'s Counterclaims, Filed May 27, 2011, 12 pages.
Reexamination Documents for U.S. Patent No. 7,774,833, filed Jun. 27, 2011, 32 pages, included: Request for Reexamination Transmittal Form; Request for Ex Parte Reexamination; Form PTO/SB/08; Exhibit A—U.S. Patent No. 7,774,833.
"HP Procurve Series 5300XL Switches," Management and Configuration Guide, Hewlett-Packard Company, Edition 7, published Apr. 2003, 757 pages.
U.S. Appl. No. 10/925,155, filed Aug. 24, 2004, Kwan.
"Authenticated VLANs: Secure Network Access at Layer 2," An Alcatel White Paper, Nov. 2002, pp. 1-14, Alcatel Internetworking, Inc.
"Automatic Spoof Detector (aka Spoofwatch)," Jan. 28, 2002, at URL: http://www.anml.iu.edu/PDF/Automatic_Spoof_Detector.pdf, printed on Jul. 23, 2003, 2 pages.
Bass, "Spoofed IP Address Distributed Denial of Service Attacks: Defense-in-Depth," at URL: http://www.sans.org/rr/threats/spoofed.php, printed on Jul. 23, 2003, Aug. 13, 2001, version 2.0, 7 pages.
"CERT® Incident Note IN-2000-04 (Denial of Service Attacks using Nameservers)," Jan. 2001, at URL: http://www.cert.org/incident_notes/IN-2000-04.html, printed on Jul. 23, 2003, 3 pages.
"Cisco Catalyst 1900 Series Switches," at URL: http://www.cisco.com/en/US/products/hw/switches/ps574/products_configuration_guide_chapter09186a008007ef90.html#xtocid3, printed on Jul. 29, 2003, 13 pages (PDF & web pages).
Cisco Systems, "Virtual LAN Security Best Practices," copyright 1992-2002, pp. 1-13, Cisco Systems, Inc.
"Configuring Network Security with ACLs," Catalyst 3550 Multilayer Switch Software Configuration Guide, Cisco IOS Release 12.1 (13) EA1, Mar. 2003, Ch. 27, pp. 1-48, Cisco Systems, Inc.
"Configuring Port-Based Traffic Control," Catalyst 3550 Multilayer Switch Software Configuration Guide, Cisco IOS Release 12.1 (13) EA1, Mar. 2003, Ch. 20, pp. 1-14, Cisco Systems, Inc.
"Configuring 802.1X Port-Based Authentication," Catalyst 3550 Multilayer Switch Software Configuration Guide, Cisco IOS Release 12.1 (13) EA1, Mar. 2003, Ch. 9, pp. 1-18, Cisco Systems, Inc.
Congdon, et al., "IEEE 802.1X Remote Authentication Dial in User Service (RADIUS) Usage Guidelines," The Internet Society, 2003, at URL: http://www.faqs.org/ftp/rfc/pdf/rfc3580.txt.pdf, 30 pages.
Gill, "Catalyst Secure Template," Nov. 14, 2002, version 1.21, at URL: http://www.cymru.com/gillsr/documents/catalyst-secure-template.htm, printed on Nov. 29, 2010, pp. 1-19.
Glenn, "A Summary of DoS/DDoS Prevention, Monitoring and Mitigation Techniques in a Service Provider Environment," SANS Institute, Aug. 21, 2003, 34 pages.
Haviland, "Designing High Performance Campus Intranets with Multilayer Switching," 1998, 33 pages, Cisco Systems, Inc.
"IEEE Standard for Local and Metropolitan Area Networks—Port-Based Network Access Control," IEEE Std 802.1X-2001, Jul. 13, 2001, pp. 1-134, IEEE, Inc.
"[IP-spoofing Demystified] (Trust-Relationship Exploitation)," Jun. 1996, at URL: http://www.networkcommand.com/docs/ipspoof.txt, printed on May 18, 2003, 9 pages.
"Keen Veracity Legions of the Underground," at URL: http://www.legions.org/kv/kv7.txt, printed on Jun. 24, 2003, issue 7, pp. 1-41.
Microsoft, "Recommendations for IEEE 802.11 Access Points," Apr. 2, 2002, at URL: http://www.microsoft.com/whdc/device/network/802x/AccessPts.mspx, printed on Mar. 8, 2007, pp. 1-16.
Pfleeger, "Security in Computing," 2nd edition, 1996, pp. 426-434, Prentice Hall PTR, NJ.
Schmid, et al., "An Access Control Architecture for Microcellular Wireless IPv6 Networks," LCN 2001: proceedings: 26th Annual IEEE Conference on Local Computer Networks, Tampa, Florida, USA, 2001, Nov. 14-16, 2001, pp. 454-463, IEEE Computer Society, Los Alamitos, US.
Sharma, "IP Spoofing," 2001, at URL: http://www.linuxgazette.com/issue63/sharma.html, printed on Jul. 23, 2003, 3 pages.
"Tech Brief Extreme Ware 6.2," at URL: http://www.extremenetworks.com/libraries/prodpdfs/products/ex_ware_tech_brief.pdf, printed on Jul. 29, 2003, 8 pages, (Extreme Networks PDF).
"Unified Access Architecture for Wired and Wireless Networks," at URL: http://www.extremenetworks.com/libraries/prodpdfs/products/UnifiedWireless.asp, printed on Jul. 29, 2003, 10 pages.
Welcher, "Switching MultiLayer Switching," Chesapeake Netcraftsmen, Copyright 1999, pp. 1-7, available at URL: http//www.netcraftsmen.net/welcher/papers/switchhmls.html.
Wright, "Using Policies for Effective Network Management," International Journal of Network Management, 1999, pp. 1-8, John Wiley & Sons, Ltd.
Non-Final Office Action for U.S. Appl. No. 10/458,628, mailed on Dec. 8, 2006, 14 pages.
Final Office Action for U.S. Appl. No. 10/458,628, mailed on Jun. 1, 2007, 19 pages.
Non-Final Office Action for U.S. Appl. No. 10/458,628, mailed on Nov. 30, 2007, 19 pages.
Non-Final Office Action for U.S. Appl. No. 10/458,628, mailed on Aug. 15, 2008, 20 pages.
Final Office Action for U.S. Appl. No. 10/458,628, mailed on Feb. 26, 2009, 26 pages.
Non-Final Office Action for U.S. Appl. No. 10/458,628, mailed on Oct. 8, 2009, 23 pages.
Final Office Action for U.S. Appl. No. 10/458,628, mailed on Mar. 24, 2010, 29 pages.
Non Final Office Action for U.S. Appl. No. 10/631,091, mailed on Jan. 12, 2007, 9 pages.
Final Office Action for U.S. Appl. No. 10/631,091, mailed on May 28, 2008, 13 pages.
Non Final Office Action for U.S. Appl. No. 10/631,091, mailed on Oct. 28, 2008, 15 pages.
Notice of Allowance for U.S. Appl. No. 10/631,091 mailed on Apr. 24, 2009, 9 pages.
Non Final Office Action for U.S. Appl. No. 10/631,366, mailed on Feb. 2, 2007, 14 pages.
Non-Final Office Action for U.S. Appl. No. 10/631,366, mailed on Feb. 2, 2007, 14 pages.
Final Office Action for U.S. Appl. No. 10/631,366, mailed on Oct. 10, 2007, 17 pages.
Non-Final Office Action for U.S. Appl. No. 10/631,366, mailed on Jul. 17, 2008, 12 pages.
Notice of Allowance for U.S. Appl. No. 10/631,366, mailed on Jan. 13, 2009, 10 pages.
Non-Final Office Action for U.S. Appl. No. 10/631,898, mailed on Jul. 24, 2007, 11 pages.
Non-Final Office Action for U.S. Appl. No. 10/631,898, mailed on Feb. 20, 2008, 13 pages.
Non-Final Office Action for U.S. Appl. No. 10/631,898, mailed on Sep. 4, 2008, 14 pages.
Non-Final Office Action for U.S. Appl. No. 10/631,898, mailed on Apr. 28, 2009, 17 pages.
Final Office Action for U.S. Appl. No. 10/631,898, mailed on Dec. 18, 2009, 17 pages.

(56) References Cited

OTHER PUBLICATIONS

Non-Final Office Action for U.S. Appl. No. 10/631,898, mailed on Feb. 18, 2010, 24 pages.
Non-Final Office Action for U.S. Appl. No. 10/654,417, mailed on Dec. 15, 2006, 11 pages.
Final Office Action for U.S. Appl. No. 10/654,417, mailed on Jun. 18, 2007, 15 pages.
Non-Final Office Action for U.S. Appl. No. 10/654,417, mailed on Dec. 31, 2007, 19 pages.
Non-Final Office Action for U.S. Appl. No. 10/654,417, mailed on Jul. 29, 2008, 19 pages.
Final Office Action for U.S. Appl. No. 10/654,417, mailed on Feb. 27, 2009, 17 pages.
Non-Final Office Action for U.S. Appl. No. 10/654,417, mailed on Sep. 4, 2009, 20 pages.
Final Office Action for U.S. Appl. No. 10/654,417, mailed on Mar. 24, 2010, 28 pages.
Notice of Allowance for U.S. Appl. No. 10/654,417, mailed on Apr. 22, 2010, 14 pages.
Non Final Office Action for U.S. Appl. No. 10/668,455, mailed on Mar. 20, 2009, 25 pages.
Notice of Allowance for U.S. Appl. No. 10/668,455, mailed on Jun. 1, 2010, 8 pages.
Non Final Office Action for U.S. Appl. No. 10/850,505, mailed on Dec. 7, 2007, 14 pages.
Final Office Action for U.S. Appl. No. 10/850,505, mailed on Jun. 12, 2008, 12 pages.
Notice of Allowance for U.S. Appl. No. 10/850,505, mailed on Sep. 4, 2008, 6 pages.
Notice of Allowance for U.S. Appl. No. 10/850,505, mailed on Jan. 14, 2009, 10 pages.
Office Action for U.S. Appl. No. 10/925,155, mailed on Apr. 14, 2009.
Office Action for U.S. Appl. No. 10/925,155, mailed on Oct. 27, 2008.
Office Action for U.S. Appl. No. 10/925,155, mailed on Mar. 20, 2008.
Office Action for U.S. Appl. No. 10/925,155, mailed on Jan. 11, 2010.
Non-Final Office Action for U.S. Appl. No. 12/392,398, mailed on Sep. 1, 2010, 22 pages.
Final Office Action for U.S. Appl. No. 12/392,398, mailed on Jan. 20, 2011, 11 pages.
Non-Final Office for U.S. Appl. No. 12/478,216, mailed on Sep. 13, 2010, 15 pages.
Requirement for Restriction/Election for U.S. Appl. No. 12/478,216, mailed on Jan. 18, 2011, 5 pages.
Non-Final Office Action for U.S. Appl. No. 12/478,229, mailed on Jan. 21, 2011, 15 pages.
Phaal et al., "InMon Corporation's sFlow: A Method for Monitoring Traffic in Switched and Routed Networks," Network Working Group Sep. 2001, pp. 1-29 available at http://www.ietf.org/rfc/rfc3176.txt.
U.S. Appl. No. 10/107,749, filed Mar. 26, 2002 in the name of Sunil P. Chitnis et al., entitled "Network Monitoring Using Statistical Packet Sampling".
Kwan, "System and Method for ARP Anti-Spoofing Security," U.S. Appl. No. 13/184,748, filed Jul. 18, 2011, 29 pages.
"Catalyst 2950 Desktop Switch Software Configuration Guide," Cisco Systems, Cisco IOS Release 12.1 (9) EA1, Apr. 2002, 544 pages.
"IEEE 802.1X Authentication for Wireless Connections," The Cable Guy, at URL: http://technet.microsoft.com/en-us/library/bb878016.aspx, Apr. 2002, 6 pages.
IEEE, "Part 3: Carrier sense multiple access with collision detection (CSMA/CD) access method and physical layer specifications," IEEE Std. 802.3 1998 Edition, 810 pages.
Kwan, "802.1X Port Authentication with Microsoft's Active Directory," White Paper, Foundry Networks, at URL: http://www.brocade.com/downloads/documents/white_papers/wp-8021x-authentication-active-directory.pdf, Mar. 2003, 26 pages.
Kwan, "IronShield Best Practices Management VLANs," White Paper, ver. 1.0.0, published Apr. 2003, 23 pages.
Singhal, "Understanding Wireless LAN Security: A Comprehensive Solution Through the ReefEdge Connect System," Reef Edge TechZone, copyright Nov. 2001, 18 pages.
Order Granting Reexamination of U.S. Patent No. 7,774,833, for Control No. 90/011,769, mailed Aug. 26, 2011, 12 pages.
Request for Inter Partes Reexamination for U.S. Patent No. 7,774,833, filed Nov. 8, 2011, 57 pages.
Notice of Inter Partes Reexamination Request Filing Date for Control No. 95/001,811, mailed Nov. 17, 2011, 1 page.
Notice of Assignment of Inter Partes Reexamination Request for Control No. 95/001,811, mailed Nov. 17, 2011, 1 page.
Civil Action—CV10-03428—Complaint for Patent Infringement, Trade Secret Misappropriation, Breach of Contract, Interference with Contract, and Unfair Competition Under Cal. Bus. & Prof. Code §§ 17200 et seq., filed on Aug. 4, 2010, with Exhibits A through M, 196 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint, filed by A10 Networks, Inc., Lee Chen, Rajkumar Jalan, Ron Szeto, filed Oct. 11, 2010, 30 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages. Included: Proposed Order.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Answer to Plaintiffs Brocade Communications Systems, Inc. and Foundry Networks, LLC's Counterclaims, filed by A10 Networks, Inc., filed Jun. 17, 2011, 4 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages, Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 28, 2011, 34 pages. Included: Proposed Order for Temporary Restraining Order and Order to Show Cause and Proposed Preliminary Injunction.

(56) References Cited

OTHER PUBLICATIONS

Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction, filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction, filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction, filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction, filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction, filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction, filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction, filed by Brocade Communications Systems, Inc., Foundry Networks, LLC, filed Jul. 26, 2011, 506 pages. Included: Exhibits 1 through 30.
Civil Action CV10-03428—Plaintiffs' Reply Memorandum in Further Support of Motion for Temporary Restraining Order and Preliminary Injunction [Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion for Temporary Restraining Order and Preliminary Injunction by Brocade Communications Systems, Inc., Foundry Networks, LLC, filed Aug. 5, 2011, 2 pages.
Civil Action CV10-03428—Notice of Granted Requests for Reexamination of Patents 7,558,195, 7,657,629, 7,840,678, Filed Aug. 5, 2011, 316 pages.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428—Order Denying Motion for Temporary Restraining Order [Redacted Version] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.
Civil Action CV10-03428—Joint Claim Construction, Filed Aug. 26, 2011, 29 pages.
Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages. Included: Exhibits A through F.
Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, No Filing Date, 779 pages. Included: Exhibits A through M.
Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.
Civil Action CV10-03428—Redacted Declaration of Dr. Chi Zhang in Support of Opposition to Plaintiffs' Motion for Temporary Restraining Order and Preliminary Injunction, by A10 Networks, Inc., filed Sep. 28, 2011, 4 pages.
Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.
Civil Action CV10-03428—Declaration of Teri H.P. Nguyen in Support of Motion for Partial Summary Judgment Notice of Motion and Motion for Partial Summary Judgment on Assignor Estoppel filed by Brocade Communications Systems, Inc., Foundry Networks, LLC, filed Oct. 11, 2011, 259 pages. Included Exhibits A through R.
Civil Action CV10-03428—Initial Claim Construction Brief, filed by Brocade Communications Systems, Inc., Foundry Networks, LLC, filed Oct. 11, 2011, 31 pages.
Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.
Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel filed, by A10 Networks, Inc., Lee Chen, Rajkumar Jalan, Ron Szeto, filed Nov. 8, 2011, 17 pages.
Civil Action CV10-03428—Responsive Claim-Construction Brief (PLR 4-5(b)) by A10 Networks, Inc., Lee Chen, Rajkumar Jalan, filed Nov. 15, 2011, 28 pages.
Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages.
Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Administrative Motion to Consider Whether Cases Should be Related, filed by Brocade Communications Systems, Inc., Foundry Networks, LLC, filed Nov. 21, 2011, 8 pages, including Declaration and Proposed Order.

(56) References Cited

OTHER PUBLICATIONS

Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages. Included: Exhibits 1 through 6.
Civil Action CV10-03428—Litigation Docket, printed on Nov. 26, 2011, 44 pages.
Non-Final Office Action for U.S. Appl. No. 10/458,628, mailed on Aug. 2, 2010, 24 pages.
Final Office Action for U.S. Appl. No. 10/458,628, mailed on Nov. 16, 2010, 26 pages.
Final Office Action for U.S. Appl. No. 10/458,628, mailed on Sep. 7, 2011, 26 pages.
Non-Final Office Action for U.S. Appl. No. 10/458,628, mailed on Nov. 2, 2011, 38 pages.
Advisory Action for U.S. Appl. No. 10/631,366, mailed on Mar. 28, 2008, 5 pages.
Non-Final Office Action for U.S. Appl. No. 10/631,091, mailed Jul. 24, 2007, 8 pages.
Requirement for Restriction/Election for U.S. Appl. No. 10/631,091, mailed on Feb. 20, 2008, 4 pages.
Advisory Action for U.S. Appl. No. 10/631,091, mailed on Aug. 13, 2008, 2 pages.
Notice of Allowance for U.S. Appl. No. 10/631,898, mailed on Aug. 12, 2010, 21 pages.
Notice of Allowance for U.S. Appl. No. 10/631,898, mailed Dec. 7, 2010, 12 pages.
Non-Final Office Action for U.S. Appl. No. 10/668,455, mailed Nov. 16, 2009, 25 pages.
Non-Final Office Action for U.S. Appl. No. 10/925,155, mailed on Oct. 6, 2010, 67 pages.
Final Office Action for U.S. Appl. No. 10/925,155, mailed Apr. 6, 2011, 63 pages.
Non-Final Office Action for U.S. Appl. No. 12/392,422, mailed on May 24, 2011, 25 pages.
Final Office Action for U.S. Appl. No. 12/392,422, mailed on Oct. 3, 2011, 13 pages.
Notice of Allowance for U.S. Appl. No. 12/392,422, mailed on Dec. 14, 2011, 7 pages.
Final Office Action for U.S. Appl. No. 12/478,229, mailed on Jun. 29, 2011, 10 pages.
Non-Final Office Action for U.S. Appl. No. 12/478,229, mailed Sep. 28, 2011, 9 pages.
Non-Final Office Action for U.S. Appl. No. 12/769,626, mailed on Jul. 12, 2011, 47 pages.
Final Office Action for U.S. Appl. No. 12/769,626, mailed Oct. 24, 2011, 32 pages.
"Cisco IOS Software Releases 12/2 T," at URL: http://www.cisco.com/en/US/docs/ios/12_2t/12_2t15/feature/guide/ftdsiaa.html, printed on Apr. 24, 2012, 14 pages.
"Cisco—Cable Source_Verify and IP Address Security," at UR: http://www.cisco.com/en/US/tech/tk86/tk803/technologies_tech_note09186a00800a7828.shtm, printed on Apr. 24, 2012, 11 pages.
"IP Addressing Services," at URL: http://www.cisco.com/en/US/tech/tk648/tk361/technologies_tech_note09186a0080094adb.shtml, printed Apr. 24, 2012, 4 pages.
Office Action in Ex Parte Reexamination for Control No. 90/011,769, mailed on Feb. 16, 2012, 25 pages.
Office Action in Inter Partes Reexamination for Control No. 95/001,811, mailed on Feb. 1, 2012, 21 pages.
Civil Action CV10-03428—Brocade's Opposition to Defendant's Motion to Stay Proceedings Pending Reexaminations, filed Dec. 7, 2011, 18 pages.
Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.
Civil Action CV10-03428—Order Construing Disputed Claim Terms of U.S. Patent Nos. 7,647,427; 7,716,370; 7,558,195; 7,454,500; 7,581,009; 7,657,629; 7,584,301; 7,840,678; and 5,875,185, filed Jan. 6, 2012, 33 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 4 pages.
Civil Action CV10-03428—Stipulation Regarding Plaintiffs' Motion for Partial Summary Judgement of Assignor Estoppel, filed Nov. 30, 2011, 2 pages.
Civil Action CV10-03428—Stipulation Regarding Parties' Proposed Claim Constructions, filed Dec. 19, 2011, 6 pages.
Civil Action CV10-03428—Declaration of Izhak Rubin in Support of Brocade Communications Systems, Inc.'s and Foundry Networks LLC's: (1) Claim Construction Brief; (2) Opposition to Defendants' Motion for Summary Judgement of Non-Infringement of U.S. Patent Nos. 7,647,427 and 7,716,370; and (3) Opposition to Defendants' Motion for Summary Judgement of Non-Infringement of U.S. Patent No. 7,558,195, filed Nov. 8, 2011, 34 pages.
Civil Action CV10-03428—Defendant and Counterclaimant A10 Networks, Inc.'s Notice of Granted Requests for Inter Partes Reexamination of Plaintiffs U.S. Patent Nos. 7,558,195; 7,454,500; 7,574,508; and 7,720,977, filed Dec. 28, 2011, 3 pages.
Civil Action CV10-03428—Order Granting Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,558,195; and 7,774,833, filed Jun. 18, 2012, 20 pages.
Civil Action CV10-03428—Declaration of Siddhartha M. Venkatesan in Support of Opposition to Motion to Stay Proceedings Pending Reexaminations, filed Dec. 7, 2011, 3 pages.
Civil Action CV10-03428—Declaration of Azer Bestavros in Support of Brocade's Claim Construction Brief, filed Dec. 16, 2011, 24 pages.
Civil Action CV10-03428—Order by Judge Lucy H. Koh Denying A10's Motion for Summary Judgment of NonInfringement; Granting Brocade's Motion for Summary Judgment of NonInfringement, issued Jan. 6, 2012, 20 pages.
Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.
Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.

(56) References Cited

OTHER PUBLICATIONS

Civil Action CV10-03428—Order by Hon. Lucy H. Koh granting Motion for Leave to File "Notice of Activity Before the Patent Office From the Ongoing Inter Partes and Ex Parte Reexaminations of the Asserted Brocade Patents," issued Mar. 15, 2012, 5 pages.
Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,55,195; and 7,774,833, filed May 3, 2012, 23 pages.
Civil Action CV10-03428—Exhibit 17 to Declaration of Scott R. Mosko in Support of Defendants A10 Networks, Inc.'s, Lee Chen's, Rajkumar Jalan's, Ron Szeto's and Steve Hwang's Motion for Summary Judgment, filed May 4, 2012, 25 pages.
Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.
Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.
Civil Action CV10-03428—Plaintiff's Objections to Declarations Submitted by A10 Networks, Inc., Lee Chen, Rajkumar Jalan, Ron Szeto and Steve Hwang in Support of Their Motion for Partial Summary Judgment, filed May 17, 2012, 3 pages.
Civil Action CV10-03428—Declaration of Elizabeth C. McBride in Support of Plaintiffs Brocade Communications Systems, Inc.'s and Foundry Networks, LLC's Opposition to Defendants' Motion for Summary Judgment, filed May 17, 2012, 135 pages.
Civil Action CV10-03428—Declaration of Gary Hemminger in Support of Brocade Communications Systems, Inc.'s and Foundry Networks, LLC's Opposition to Defendants A10 Networks, Inc.'s, Lee Chen's, Rajkumar Jalan's, Ron Szeto's and Steve Hwang's Motion for Summary Judgment, filed May 17, 2012, 3 pages.
Civil Action CV10-03428—Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Patent Nos. 7,454,500, 7,581,009; 7,558,195; and 7,774,833, filed May 17, 2012, 30 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Patent Nos. 7,454,500; 7,581,009; 7,558,195; and 7,774,833, filed May 17, 2012, 13 pages.
Civil Action CV10-03428—Order Granting in Part and Denying in Part A10's Motion for Summary Judgment, Jun. 12, 2012, 36 pages.
Civil Action CV10-03428—Defendant and Counterclaimant A10 Network, Inc.'s Amended Supplemental Claim Construction Brief, filed Jul. 2, 2012, 9 pages.
Civil Action CV10-03428—Plaintiff's Supplemental Claim Construction Brief, with Declarations of Azer Bestravros and Izhak Rubin, filed Jul. 3, 2012, 8 pages.
Civil Action CV10-03428—Further Claim Construction Order, Jul. 5, 2012, 4 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Civil Action CV10-03428, Transcript of the Deposition of Kevin Delgadillo, taken Mar. 14, 2012, 12 pages.
Civil Action 10-332—Complaint for Patent Infringement, filed on Apr. 23, 2010 (Exhibits A through G attached as separate files), 14 pages.
Civil Action 10-332—Civil Cover Sheet, filed on Apr. 23, 2010, 1 page.
*Brocade Communication Systems, Inc.* v. *A10 Networks, Inc.*, Civil Action 10-332—Exhibit A to the Complaint (U.S. Patent No. 7,558,195 B1, issued on Jul. 7, 2009, Kuo et al.), 29 pages.
*Brocade Communication Systems, Inc.* v. *A10 Networks, Inc.*, Civil Action 10-332—Exhibit B to the Complaint (U.S. Patent No. 7,581,009 B1, issued on Aug. 25, 2009, Hsu et al.), 15 pages.
*Brocade Communication Systems, Inc.* v. *A10 Networks, Inc.*, Civil Action 10-332—Exhibit C to the Complaint (U.S. Patent No. 7,454,500 B1, issued on Nov. 18, 2008, Hsu et al.), 12 pages.
*Brocade Communication Systems, Inc.* v. *A10 Networks, Inc.*, Civil Action 10-332—Exhibit D to the Complaint (U.S. Patent No. 7,574,508 B1, issued on Aug. 11, 2009, Kommula), 15 pages.
*Brocade Communication Systems, Inc.* v. *A10 Networks, Inc.*, Civil Action 10-332—Exhibit E to the Complaint (U.S. 7,647,427 B1, issued on Jan. 12, 2010, Devarapalli), 10 pages.
*Brocade Communication Systems, Inc.* v. *A10 Networks, Inc.*, Civil Action 10-332—Exhibit F to the Complaint (U.S. 7,657,629 B1, issued on Feb. 2, 2010, Kommula), 20 pages.
*Brocade Communication Systems, Inc.* v. *A10 Networks, Inc.*, Civil Action 10-332—Exhibit G to the Complaint (U.S. 7,584,301 B1, issued on Sep. 1, 2009, Joshi), 16 pages.
Civil Action 10-332—Second Amended and Supplemental Complaint for Patent Infringement, filed on Jul. 16, 2010, (Exhibits A through I attached as separate files), 18 pages.
*Brocade Communication Systems, Inc.* v. *A10 Networks, Inc.*, Civil Action 10-332—Exhibit A to the Second Amended Complaint (U.S. 7,558,195 B1, issued on Jul. 7, 2009, Kuo et al.) 29 pages.
*Brocade Communication Systems, Inc.* v. *A10 Networks, Inc.*, Civil Action 10-332—Exhibit B to the Second Amended Complaint (U.S. Patent No. 7,581,009 B1, issued on Aug. 25, 2009, Hsu et al.), 15 pages.
*Brocade Communication Systems, Inc.* v. *A10 Networks, Inc.*, Civil Action 10-332—Exhibit C to the Second Amended Complaint (U.S. Patent No. 7,454,500 B1, issued on Nov. 18, 2008, Hsu et al.), 12 pages.
*Brocade Communication Systems, Inc.* v. *A10 Networks, Inc.*, Civil Action 10-332—Exhibit D to the Second Amended Complaint (U.S. Patent No. 7,574,508 B1, issued on Aug. 11, 2009, Kommula), 15 pages.
*Brocade Communication Systems, Inc.* v. *A10 Networks, Inc.*, Civil Action 10-332—Exhibit E to the Second Amended Complaint (U.S. 7,647,427 B1, issued on Jan. 12, 2010, Devarapalli), 10 pages.
*Brocade Communication Systems, Inc.* v. *A10 Networks, Inc.*, Civil Action 10-332—Exhibit F to the Second Amended Complaint (U.S. 7,657,629 B1, issued on Feb. 2, 2010, Kommula), 20 pages.
*Brocade Communication Systems, Inc.* v. *A10 Networks, Inc.*, Civil Action 10-332—Exhibit G to the Second Amended Complaint (U.S. 7,584,301 B1, issued on Sep. 1, 2009, Joshi), 16 pages.
*Brocade Communication Systems, Inc.* v. *A10 Networks, Inc.*, Civil Action 10-332—Exhibit H to the Second Amended Complaint (U.S. 7,716,370 B1, issued on May 11, 2010, Devarapalli), 12 pages.
*Brocade Communication Systems, Inc.* v. *A10 Networks, Inc.*, Civil Action 10-332—Exhibit I to the Second Amended Complaint (U.S. 7,720,977 B1, issued on May 18, 2010, Li), 11 pages.
Civil Action 10-332—Report on the Filing or Determination of an Action Regarding a Patent or Trademark, filed on Aug. 5, 2010, 2 pages.
Civil Action 10-332—Notice of Voluntary Dismissal Without Prejudice, filed on Aug. 5, 2010, 2 pages.
Civil Action—Case No. CV10-03443—Notice of Voluntary Dismissal Without Prejudice, filed Aug. 16, 2010, 2 pages.
*A10 Networks, Inc.* v. *Brocade Communications Systems, Inc.*, Civil Action CV10-03443—Exhibit A to the Complaint (U.S. 7,558,195 B1, issued on Jul. 7, 2009, Kuo et al.) 29 pages.
*A10 Networks, Inc.* v. *Brocade Communications Systems, Inc.*, Civil Action CV10-03443—Exhibit B to the Complaint (U.S. Patent No. 7,581,009 B1, issued on Aug. 25, 2009, Hsu et al.), 15 pages.
*A10 Networks, Inc.* v. *Brocade Communications Systems, Inc.*, Civil Action CV10-03443—Exhibit C to the Complaint (U.S. Patent No. 7,454,500 B1, issued on Nov. 18, 2008, Hsu et al.), 12 pages.
*A10 Networks, Inc.* v. *Brocade Communications Systems, Inc.*, Civil Action CV10-03443—Exhibit D to the Complaint (U.S. Patent No. 7,574,508 B1, issued on Aug. 11, 2009, Kommula), 15 pages.

(56) References Cited

OTHER PUBLICATIONS

*A10 Networks, Inc. v. Brocade Communications Systems, Inc.*, Civil Action CV10-03443—Exhibit E to the Complaint (U.S. 7,647,427 B1, issued on Jan. 12, 2010, Devarapalli), 10 pages.
*A10 Networks, Inc. v. Brocade Communications Systems, Inc.*, Civil Action CV10-03443—Exhibit F to the Complaint (U.S. 7,657,629 B1, issued on Feb. 2, 2010, Kommula), 20 pages.
*A10 Networks, Inc. v. Brocade Communications Systems, Inc.*, Civil Action CV10-03443—Exhibit G to the Complaint (U.S. 7,584,301 B1, issued on Sep. 1, 2009, Joshi), 16 pages.
*A10 Networks, Inc. v. Brocade Communications Systems, Inc.*, Civil Action CV10-03443—Exhibit H to the Complaint (U.S. 7,716,370 B1, issued on May 11, 2010, Devarapalli), 12 pages.
*A10 Networks, Inc. v. Brocade Communications Systems, Inc.*, Civil Action CV10-03443—Exhibit I to the Complaint (U.S. 7,720,977 B1, issued on May 18, 2010, Li), 11 pages.
Civil Action—CV10-03428—Exhibit A to Complaint for Patent Infringement, Trade Secret Misappropriation, Breach of Contract, Interference with Contract, and Unfair Competition Under Cal. Bus. & Prof. Code §§ 17200 et seq.—Starridge Networks, Inc. Proprietary Information and Inventions Agreement signed by Lee Chen, exhibit filed Aug. 4, 2010, 7 pages.
Civil Action—CV10-03428—Exhibit B to Complaint for Patent Infringement, Trade Secret Misappropriation, Breach of Contract, Interference with Contract, and Unfair Competition Under Cal. Bus. & Prof. Code §§ 17200 et seq.—Foundry Networks, Inc. Proprietary Information and Inventions Agreement signed by David Cheung on Jul. 22, 1998, exhibit filed Aug. 4, 2010, 7 pages.
Civil Action—CV10-03428—Exhibit C to Complaint for Patent Infringement, Trade Secret Misappropriation, Breach of Contract, Interference with Contract, and Unfair Competition Under Cal. Bus. & Prof. Code §§ 17200 et seq.—Starridge Networks, Inc. Proprietary Information and Inventions Agreement signed by Rajkumar Jalan on Sep. 20, 1996, exhibit filed Aug. 4, 2010, 7 pages.
Civil Action—CV10-03428—Exhibit D to Complaint for Patent Infringement, Trade Secret Misappropriation, Breach of Contract, Interference with Contract, and Unfair Competition Under Cal. Bus. & Prof. Code §§ 17200 et seq.—Foundry Networks, Inc. Proprietary Information and Inventions Agreement signed by Ronald Szeto on Dec. 29, 1999, exhibit filed Aug. 4, 2010, 7 pages.
Civil Action—CV10-03428—Exhibit E to Complaint for Patent Infringement, Trade Secret Misappropriation, Breach of Contract, Interference with Contract, and Unfair Competition Under Cal. Bus. & Prof. Code §§ 17200 et seq.—Kuo et al., U.S. Patent No. 7,558,195 B1, issued Jul. 7, 2009, exhibit filed Aug. 4, 2010, 29 pages.
Civil Action—CV10-03428—Exhibit F to Complaint for Patent Infringement, Trade Secret Misappropriation, Breach of Contract, Interference with Contract, and Unfair Competition Under Cal. Bus. & Prof. Code §§ 17200 et seq.—Hsu et al., U.S. Patent No. 7,581,009 B1, issued Aug. 25, 2009, exhibit filed Aug. 4, 2010, 15 pages.
Civil Action—CV10-03428—Exhibit G to Complaint for Patent Infringement, Trade Secret Misappropriation, Breach of Contract, Interference with Contract, and Unfair Competition Under Cal. Bus. & Prof. Code §§ 17200 et seq.—Hsu et al., U.S. Patent No. 7,454,500 B1, issued Nov. 18, 2008, exhibit filed Aug. 4, 2010, 12 pages.
Civil Action—CV10-03428—Exhibit H to Complaint for Patent Infringement, Trade Secret Misappropriation, Breach of Contract, Interference with Contract, and Unfair Competition Under Cal. Bus. & Prof. Code §§ 17200 et seq.—Kommula, U.S. Patent No. 7,574,508 B1, issued Aug. 11, 2009, exhibit filed Aug. 4, 2010, 14 pages.
Civil Action—CV10-03428—Exhibit I to Complaint for Patent Infringement, Trade Secret Misappropriation, Breach of Contract, Interference with Contract, and Unfair Competition Under Cal. Bus. & Prof. Code §§ 17200 et seq.—Devarapalli, U.S. Patent No. 7,647,427, issued Jan. 12, 2010, exhibit filed Aug. 4, 2010, 10 pages.
Civil Action—CV10-03428—Exhibit J to Complaint for Patent Infringement, Trade Secret Misappropriation, Breach of Contract, Interference with Contract, and Unfair Competition Under Cal. Bus. & Prof. Code §§ 17200 et seq.—Kommula, U.S. Patent No. 7,657,629 B1, issued Feb. 2, 2010, exhibit filed Aug. 4, 2010, 20 pages.
Civil Action—CV10-03428—Exhibit K to Complaint for Patent Infringement, Trade Secret Misappropriation, Breach of Contract, Interference with Contract, and Unfair Competition Under Cal. Bus. & Prof. Code §§ 17200 et seq.—Joshi, U.S. Patent No. 7,584,301 B1, issued Sep. 1, 2009, exhibit filed Aug. 4, 2010, 16 pages.
Civil Action—CV10-03428—Exhibit L to Complaint for Patent Infringement, Trade Secret Misappropriation, Breach of Contract, Interference with Contract, and Unfair Competition Under Cal. Bus. & Prof. Code §§ 17200 et seq.—Devarapalli, U.S. Patent No. 7,716,370 B1, issued May 11, 2010, exhibit filed Aug. 4, 2010, 12 pages.
Civil Action—CV10-03428—Exhibit M to Complaint for Patent Infringement, Trade Secret Misappropriation, Breach of Contract, Interference with Contract, and Unfair Competition Under Cal. Bus. & Prof. Code §§ 17200 et seq.—Li, U.S. Patent No. 7,720,977 B1, issued May 18, 2010, exhibit filed Aug. 4, 2010, 11 pages.
Civil Action CV10-03428—Motion for Summary Judgment of Noninfringement of U.S. Patent No. 7,558,195, filed by A10 Networks, Inc., Lee Chen, Rajkumar Jalan, filed Oct. 11, 2011, 14 pages. Included: Proposed Order.
Civil Action CV10-03428—Declaration of John Chiong in Support of Defendant and Counterclaim—Plaintiff A10 Networks, Inc.'s and Defendants Lee Chen's and Rajkumar Jalan's Motion for Summary Judgment of Noninfringement of U.S. Patent No. 7,558,195 filed by A10 Networks, Inc., Lee Chen, Rajkumar Jalan, filed Oct. 11, 2011, 3 pages.
Civil Action CV10-03428—Declaration of Nitin Gambhir of Brocade Communications Systems, Inc. and Foundry Networks, LLC's Motion for Summary Judgment of Infringement of U.S. Patent Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.
Civil Action CV10-03428—Declaration of Bas De Blank in Support of Brocade Communications Systems, Inc. and Foundry Networks, LLC's Administrative Motion for Leave to File Under Seal Notice of Errata and Submission of Corrected Brief, filed Oct. 13, 2011, 3 pages.
Civil Action CV10-03428—Declaration of Nitin Gambhir in Support of Brocade Communications Systems, Inc.'s and Foundry Networks, LLC's (1) Motion for Partial Summary Judgment of Infringement of U.S. Patent Nos. 7,647,427 and S. Patent Nos. 7,647,427 and 7,716,370 [Filed Under Seal]; and (3) Opposition to Defendants' Motion for Summary Judgment of Non-Infringement of U.S. Patent No. 7,558,195 [filed Under Seal] filed by Brocade Communications Systems, Inc., Foundry Networks, LLC, filed Nov. 8, 2011, 136 pages. Include: Exhibits D, F, G, H, I, L, and M. Only 40 pages out of 136 pages were provided.
Response to Final Office Action in Ex Parte Reexamination for Control No. 90/011,769, Sep. 17, 2012, 10 pages.
Advisory Action in Ex Parte Reexamination for Control No. 90/011,769, mailed mailed Oct. 1, 2012, 14 pages.
Notice of Appeal in Ex Parte Reexamination for Control No. 90/011,769, Nov. 16, 2012, 1 page.
Appeal Brief in Ex Parte Reexamination for Control No. 90/011,769, Jan. 16, 2013, 19 pages.
Reply Brief in Ex Parte Reexamination for Control No. 90/011,769, Apr. 29, 2013, 9 pages.
Patent Owner's Notice of Litigation in Ex Parte Reexamination for Control No. 90/011,769, Aug. 14, 2013, 2 pages.
Patent Owner's Petition Under 37 CFR 1.182 to Supplement its Petition to Vacate Order Granting Reexamination as Ultra Vires with New Evidence for Control No. 95/001,811 Apr. 12, 2012, 2 pages.
Third Party Requester's Opposition to Petition to Vacate, Apr. 16, 2012, 14 pages.
Response to Nonfinal Office Action for Control No. 95/001,811,, May 1, 2012, 34 pages.
Patent Owner's Petition under 37 CFR 1.182 for Correction of Exhibit for Control No. 95/001,811,, May 10, 2012, 2 pages.

(56) References Cited

OTHER PUBLICATIONS

Third Party Requester's Comments Under 35 USC 314(B)(2) and 37 CFR 1.947 for Control No. 95/001,811, May 31, 2012, 23 pages.
Patent Owner's Petition for Reconsideration of PTO's Denial to Vacate Order Granting Reexamination as Ultra Vires or Otherwise on Grounds of Assignor Estoppel for Control No. 95/001,811, Oct. 5, 2012, 10 pages.
Third Party Requester's Opposition to Petition for Reconsideration for Control No. 95/001,811, Oct. 19, 2013, 11 pages.
Patent Owner's Response to Action Closing Prosecution for Control No. 95/001,811, Feb. 25, 2013, 37 pages.
Patent Owner's Petition to Expunge Improper Third Party Comments and Vacate the Action Closing Prosecution on Grounds of Assignor Estoppel, Mar. 22, 2013, 597 pages.
Third Party Requester's Comments Under 37 CFR 1.951(b) and 1.947 for Control No. 95/001,811, Mar. 27, 2013, 39 pages.
Third Party Requestor's Opposition to Petition to Expunge Third Party Comments and Vacate the Action Closing Prosecution for Control No. 95/001,811, Apr. 8, 2013, 8 pages.
Third Party Requester's Notice of Withdrawal of Third Party Requeter A10 Networks, Inc. for Control No. 95/001,811, Jun. 13, 2013, 2 pages.
Patent Owner's Petition Under 37 CFR 1.182 to Terminate the Reexamination Proceedings for Control No. 95/001,811, Jul. 10, 2013, 8 pages.
Patent Owner's Notice of Litigation Pursuant to 37 CFR 1.985 for Control No. 95/001,811, Aug. 14, 2013, 2 pages.
Patent Owner's Notice of Appeal Pursuant to 35 USC 315 and 37 CFR 41.61 for Control No. 95/001,811, Aug. 26, 2013, 2 pages.
Office Action in Ex Parte Reexamination for Control No. 90/011,769, mailed on Feb. 16, 2012, 23 pages.
Office Action in Inter Partes Reexamination for Control No. 95/001,811, mailed on Feb. 1, 2012, 19 pages.
Response to Office Action in Ex Parte Reexamination for Control No. 90/011,769, May 16, 2012, 14 pages.
Final Office Action in Ex Parte Reexamination for Control No. 90/011,769, mailed Jul. 17, 2012, 14 pages.
Response to Final Office Action in Ex Parte Reexamination for Control No. 90/011,769, mailed Sep. 17, 2012, 10 pages.
Advisory Action in Ex Parte Reexamination for Control No. 90/011,769, mailed Oct. 1, 2012, 14 pages.
Notice of Appeal in Ex Parte Reexamination for Control No. 90/011,769, mailed Nov. 16, 2012, 1 page.
Appeal Brief in Ex Parte Reexamination for Control No. 90/011,769, mailed Jan. 16, 2013, 19 pages.
Examiner's Answer to Appeal Brief in Ex Parte Reexamination for Control No. 90/011,769, mailed Feb. 27, 2013, 15 pages.
Reply Brief in Ex Parte Reexamination for Control No. 90/011,769, mailed Apr. 29, 2013, 9 pages.
Decision on Petition in Ex Parte Reexamination for Control No. 90/011,769, mailed Jun. 27, 2013, 6 pages.
Patent Owner's Notice of Litigation in Ex Parte Reexamination for Control No. 90/011,769, mailed Aug. 14, 2013, 2 pages.
Patent Owner's Petition Under 37 CFR 1.182 to Supplement its Petition to Vacate Order Granting Reexamination as Ultra Vires with New Evidence for Control No. 95/001,811, Apr. 12, 2012, 2 pages.
Third Party Requester's Opposition to Petition to Vacate, mailed Apr. 17, 2012, 14 pages.
Response to Nonfinal Office Action for Control No. 95/001,811, mailed May 1, 2012, 34 pages.
Patent Owner's Petition under 37 CFR 1.182 for Correction of Exhibit for Control No. 95/001,811, mailed May 10, 2012, 2 pages.
Third Party Requester's Comments Under 35 USC 314(B)(2) and 37 CFR 1.947 for Control No. 95/001,811, mailed May 31, 2012, 23 pages.
Decision on Patent Owner's Petitions for Control No. 95/001,811, mailed Sep. 10, 2012, 11 pages.
Patent Owner's Petition for Reconsideration of PTO's Denial to Vacate Order Granting Reexamination as Ultra Vires or Otherwise on Grounds of Assignor Estoppel for Control No. 95/001,811, mailed Oct. 5, 2012, 9 pages.
Third Party Requester's Opposition to Petition for Reconsideration for Control No. 95/001,811, mailed Oct. 19, 2012, 11 pages.
Action Closing Prosecution for Control No. 95/001,811, mailed Jan. 23, 2013, 30 pages.
Patent Owner's Response to Action Closing Prosecution for Control No. 95/001,811, mailed Feb. 25, 2013, 37 pages.
Patent Owner's Petition to Expunge Improper Third Party Comments and Vacate the Action Closing Prosecution on Grounds of Assignor Estoppel, mailed Mar. 22, 2013, 597 pages.
Third Party Requester's Comments Under 37 CFR 1.951(b) and 1.947 for Control No. 95/001,811, mailed Mar. 27, 2013, 39 pages.
Third Party Requestor's Opposition to Petition to Expunge Third Party Comments and Vacate the Action Closing Prosecution for Control No. 95/001,811, mailed Apr. 8, 2013, 8 pages.
Third Party Requester's Notice of Withdrawal of Third Party Requeter A10 Networks, Inc. for Control No. 95/001,811, mailed Jun. 13, 2013, 2 pages.
Patent Owner's Decision on Petition for Reconsideration of Sep. 12, 2012 Decision for Control No. 95/001,811, mailed Jul. 1, 2013, 23 pages.
Patent Owner's Decision Dismissing Petition to Expunge Comments and Action Closing Prosecution for Control No. 95/001,811, mailed Jul. 10, 2013, 8 pages.
Patent Owner's Petition Under 37 CFR 1.182 to Terminate the Reexamination Proceedings for Control No. 95/001,811, mailed Jul. 10, 2013, 8 pages.
Right of Appeal Notice for Control No. 95/001,811, mailed Jul. 24, 2013, 30 pages.
Patent Owner's Notice of Litigation Pursuant to 37 CFR 1.985 for Control No. 95/001,811, mailed Aug. 14, 2013, 2 pages.
Patent Owner's Notice of Appeal Pursuant to 35 USC 315 and 37 CFR 41.61 for Control No. 95/001,811, mailed Aug. 26, 2013, 2 pages.
Patent Owner's Decision Dismissing Petition to Terminate Inter Partes Reexamination Proceeding for Control No. 95/001,811, mailed Aug. 30, 2013, 9 pages.
NonFinal Office Action for U.S. Appl. No. 13/184,748 mailed Dec. 18, 2013, 6 pages.
Notice of Allowance for U.S. Appl. No. 13/461,519 mailed Nov. 6, 2013, 15 pages.
Rebuttal Brief for Control No. 95/001,811 mailed Feb. 24, 2014; 14 pages.
Board of Patent Appeals and Interferences Decision—Affirmance-in-part for Control No. 90/011,769 mailed Feb. 26, 2014; 48 pages.

\* cited by examiner

SYSTEM AND METHOD FOR PROTECTING CPU AGAINST REMOTE ACCESS ATTACKS

CROSS-REFERENCES TO RELATED APPLICATIONS

The present application is a continuation of U.S. application Ser. No. 10/668,455, filed Sep. 23, 2003, now U.S. Pat. No. 7,774,833 and entitled "SYSTEM AND METHOD FOR PROTECTING CPU AGAINST REMOTE ACCESS ATTACKS," the entire contents of which are incorporated herein by reference for all purposes.

FIELD OF THE INVENTION

The present invention relates to a method of providing for protection against remote attacks attempting to access management functions of network devices such as switches and routers.

BACKGROUND

FIG. 1 shows a system 10 of the prior art. A router 11 operates to provide layer 3 routing of data packets between different hosts of the system. As generally discussed herein layer 3 is a reference to the network layer which determines how to transmit messages between connected network segments. Different aspects of different operations of such networks are discussed generally in the International Standards Organization, standard ISO/IEC 7498, which defines a 7-layer model for describing interconnected systems. It is referred to as the Open Systems Interconnection (OSI) model, and is incorporated herein by reference in its entirety.

The router 11 operates to route data packets received on a port of the router to other ports of the router based on a destination IP address contained in the data packet. Typically a router will contain a large number of ports to which different data link layer (layer 2 of the OSI model) subnets are connected. In FIG. 1 six ports 12, 14, 16, 18, 20 and 22 are shown, but in many embodiments the router would include additional ports. For example, a typical router could include 24 or 36 ports.

The router 11 includes a CPU 24 which operates to control operations of the router. As is known in the art a CPU 24 operates to execute software program instructions which are loaded into the CPU 24. These software instructions can be stored in a memory 28 and the memory 28 can be utilized by the CPU 24 to access stored information, and instructions. The router 11 also includes content addressable memory (CAM) 26. The CAM includes fields which store data forming an access control list ACL. An application specific integrated circuit (ASIC) 27 is provided, and the ASIC utilizes the CAM with an ACL. The functionality of the ASIC 27 is determined by its hard wiring, and the content of the CAM and the ACL data fields (as opposed to a CPU which requires the loading of software). Thus the ASIC 27 can provide for the switching of the of data packets, or other possible functions at a very high speed relative to the operation of the CPU 24, and the CPU processing power can be used for other operational details of the router.

One aspect of the operation of the router 11 is that it allows for network managers to access control features of the router. Typically, the CPU 24 will be programmed to allow a network manager to change operations of the router. For example, a network manager might modify routing tables of the router, block certain ports from traffic from hosts having different IP addresses, set up new subnets or change subnets.

In order to gain access to, and send instructions to the CPU 24 for the management of the router 11, typically one of a number of different known management communication protocols are used; these protocols include Telnet, SSH, Web management, SNMP, and TFTP etc.

In general operation prior systems operated such that each port of the router can be used to access the CPU management functions of the router. This means that the gateway IP address associated with each port of the router can function as a management address, in that host generating data packets directed to any of the gateway addresses of the ports of router can access management of the router. As a result security procedures have to be provided which allow for filtering and controlling access to the management function of the router through each port and corresponding gateway address of the router.

FIG. 1 shows layer 2 subnets 30, 32, 34, 36, 38 and 40 connected to ports 12, 14, 16, 18, 20 and 22 of the router 11. The layer 2 subnets would typically include a number of layer 2 switches networked together, and hosts, such as personal computers or other devices would be connected to the switches. A host having proper authorization such as proper passwords, or having been previously identified by their source IP address, and generating data packets in accordance with the management communication protocol utilized by the system would be able to gain access to the management functions of the CPU 24 of the router 11 through the any of the ports 12-22 of the router 11. The CPU 24 is responsible for receiving the data packets from hosts of the layer 2 subnet which are directed to obtaining access to the management functions of the CPU 24. If the CPU 24 determines that the host attempting to obtain access to the management functions, is not authorized for such access, for example, the host could be a hacker attempting to attack the router 11, then the CPU 24 will drop the data packets from the attacking host, and additional protective measures could also be taken.

In some cases, however, an attacking host, or possibly multiple attacking hosts on different layer 2 subnets connected to different ports of the router 11 may generate a large amount of traffic directed at the CPU 24 management functions. In some cases, where the volume of traffic is sufficiently large, the CPU 24 can become overwhelmed and its ability to effectively filter and authenticate attempts to gain access to the management functions of the router 11 can be significantly reduced and render the router 11 vulnerable to attack. Thus, what is needed is a way to provide enhanced protection against attacks on the router CPU 24 and its management functions.

DETAILED DESCRIPTION

One of the shortcomings of some prior systems is that traffic on each of the ports of a router must be analyzed and filtered in connection with allowing a host on the network to have access to management functions of the router. One aspect of an embodiment of the system herein, is that it allows network administrator to define a single port and its corresponding gateway address as being a management port, and only communications received through the management port will be granted access to the management functions of the router. Thus, in one embodiment only those hosts which are connected to a subnet which is connected with the management port will be able to obtain access to the management functions of the router. For all ports of the router, other than the port which is defined to be the management port, a set of rules can be applied to data traffic on the ports, whereby any data packets received on any of the non-management ports are denied access to the management control functions of the router. Aspects of this operation are illustrated in connection with the discussion below.

Figure 2:
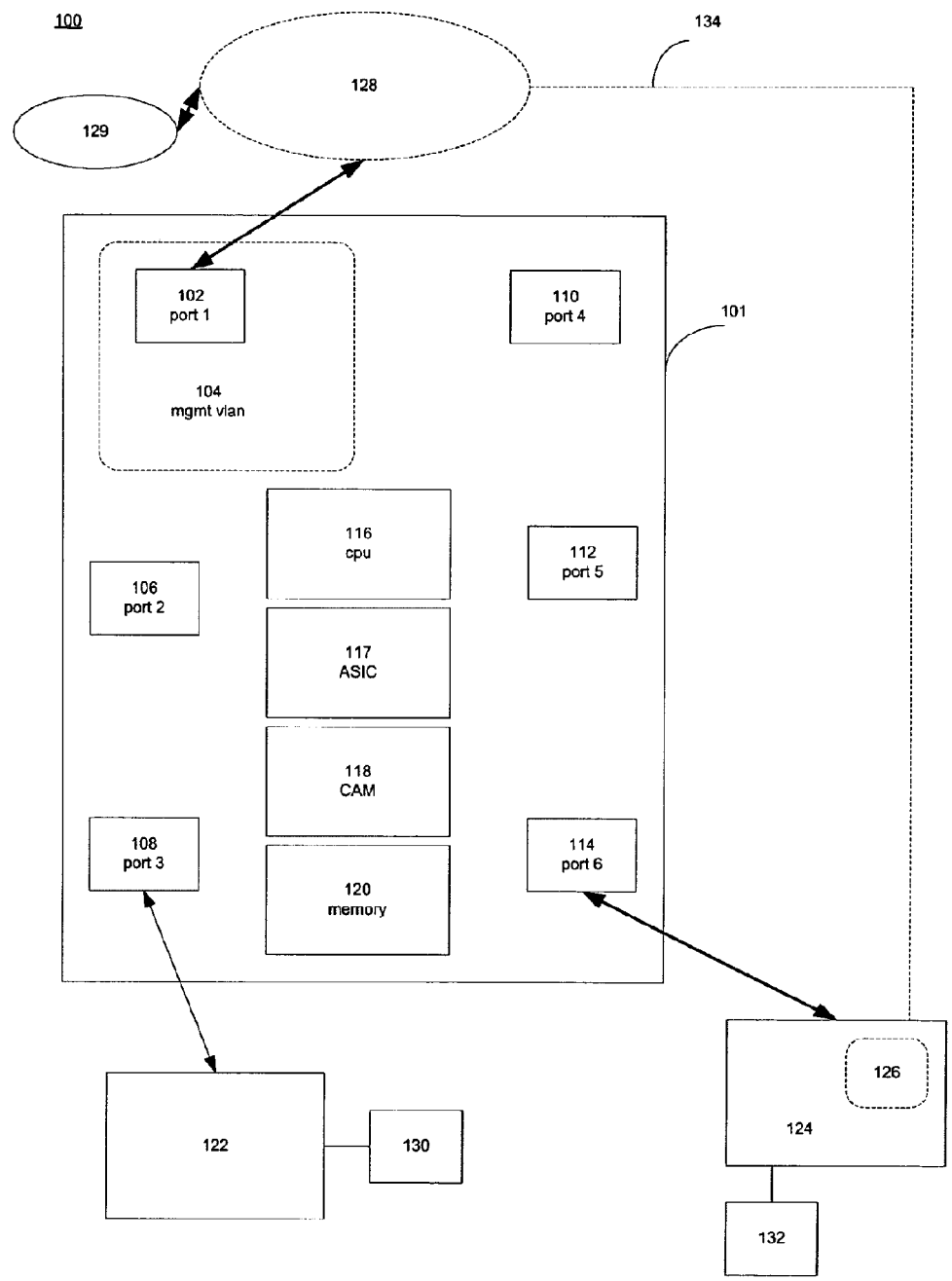
FIG. 2 shows an embodiment of a network device of the present invention.

FIG. 2 shows a system 100 of an embodiment of the present invention. The router 101 operates to provide layer 3 routing of data packets between different hosts on the system. For example, the router 101 can route data packets received on a port of the router 101 to other ports of the router based on a destination IP address contained in a received data packet. Typically a router will contain a large number of ports to which different layer 2 subnets are connected. In FIG. 2 six ports 102, 106, 108, 110, 112 and 114 are shown, but in many embodiments the router would include additional ports.

The router 101 includes a CPU 116 which operates to control operations of the router. As is known in the art, a CPU operates to execute software program instructions which are loaded into the CPU 116. These software instructions can be stored in a memory 120, and the memory 120 can be utilized by the CPU 116 to access stored information and instructions. The router 101 also includes content addressable memory. The CAM includes fields which form an access control list (ACL). An application specific integrated circuit 117 (ASIC) is provided, and the ASIC 117 utilizes the CAM with an ACL. The functionality of the ASIC 117 is determined by its hard wiring, and the content of the CAM and the ACL data fields (as opposed to a CPU which requires the loading of software). Thus the ASIC 117 can provide for the switching of the of data packets, or other possible functions at a very high speed relative to the operation of the CPU 116, and the CPU processing power can be used for other operational details of the router. Further, as described in detail below, an embodiment herein provides for the ASIC 117 and the CAM-ACL 118 operating to protect the CPU 116 from remote access to the management functions through ports other than a designated management port.

As discussed above, one aspect of the operation of the router 101 is that it allows for network managers to access control features of the router. Typically, the CPU 116 will be programmed to allow a network manager to change operations of the router. For example, a network manager might modify routing tables of the router, block certain ports from traffic from hosts having certain IP addresses, set up new subnets or change subnets. As discussed above, in order to gain access to, and send instructions to a CPU for the management of the router 101, typically one of a number of different management communication protocols are used. These protocols can include Telnet, SSH, Web management, SNMP, and TFTP etc.

To illustrate the operation of an embodiment of the invention, it is helpful to consider some aspects of the general operation of the router 101. FIG. 2 shows a layer 2 subnet 124 connected to a port 114 of the router 101. A second layer 2 subnet 122 is connected to port 108 of the router 101. As is known in the art, each port of the router would have a gateway IP address. For example port 114 could have the gateway IP address 192.168.10.254. Each host connected to the subnet 124 would be assigned an IP address indicating that that it corresponds to the subnet 124 connected to the gateway of port 114. For example, consider a host 132 connected to a layer 2 switch of the subnet 124, it could be assigned an IP address such as 192.168.10.65. The first three octets 192.168.10 are the same as the first three octets of the corresponding gateway IP address for port 114.

The port 108 would have a different gateway address. For example it could be 198.168.20.254. A host 130 connected to the layer 2 subnet 122 could have an assigned source IP address of, say for example, 198.168.20.39. Again it is noted that the first three octets of the source IP address for the host 130 correspond to the gateway address for the port 108 to which its subnet 122 is connected. If the host 132 wanted to communicate with the host 130 it would generate a data packet indicating that the desired destination was 198.168.20.39. These data packets would be received by a switch in the subnet 124, which would recognize that the destination host was not in the subnet 124 and the data packet would be routed to the gateway of port 114, and the router 101 would recognize the destination IP address in the data packet and route the data packet to port 108 and the subnet 122 where it would be directed to the host 130.

In an embodiment of the present invention a management virtual local area network MVLAN 104 is defined. A virtual local area network is a widely known arrangement whereby a number of physical ports of network devices, such as switches and routers, are logically associated with each other, and thus form a virtual local area network.

In order to provide for enhanced security the MVLAN 104 can be defined to include only a single port 102 of the router 101. The MVLAN 104 is further defined to include ports of the layer 2 subnet 128. Thus, the subnet 128, can become a management subnet. The router port 102 of the router 101 has a gateway address; for example it could be 198.168.100.254/ 24. Typically the subnet 128 connected to MVLAN port 102 would be part of a network operating center for a service provider which operates and manages the system 100. To gain access to the management of the router 101 a host, for example 129, connected to the subnet 128 would generate a data packet directed to the gateway address 192.168.100.254/ 24 using a management protocol which is utilized by the CPU 116, and based on such data packets the host 129 would then gain access to management interfaces provided by the CPU 116 to control the router 101. Additionally, in one embodiment switches in the layer 2 subnets would have a plane, or port, which is defined to be included in the MVLAN 104, and this plane would be assigned an IP address corresponding to the IP address of the gateway address for the port 102 (192.168.100.254/24). FIG. 2 shows an example of this in subnet 124, as having a MVLAN component 126 which could be assigned, for example IP address 192.168.100.1. For purposes of simplicity of discussion layer 2 subnet 124 could be a single layer 2 switch, but as one of skill in the art will appreciate, the layer 2 subnet could be configured to include multiple network devices such as layer 2 switches.

In one embodiment the ASIC 117 utilizes the CAM-ACL 118 and operates to analyze each data packet received on any of the ports of the router 101. If any of the ports which are not defined as part of the MVLAN 104 (e.g., ports 106, 108, 110, 112 and 114) receives a data packet which has a destination IP address which corresponds to the gateway IP address of the port 102 included in the MVLAN 104, in this case 192.168.100.254/24, then the ASIC 117 and CAM-ACL 118 will determine if the data packet is utilizing one of the management IP protocols (e.g. Telnet, SSH, Web management, SNMP, or TFTP etc.). The group of ports which are not part of the MVLAN are non-management ports. Depending on the actual implementation, it would frequently be the case that all of ports of the router with the exception of a single port, will be non-management ports. Depending on the number of ports in the router, the group of ports which are non-management ports, could be a single port, or in excess of 60 ports.

Where the ASIC 117 determines that a data packet received on a non-MVLAN port of the router 101 is in a management IP protocol, and the destination IP address is one which corresponds to the gateway address for the port 102, then ASIC 117 operates to filter the data packet. In general operation this filtering of such a data packet would consist of dropping the data packet, so that it would not be sent to the destination indicated as the destination IP address. This filtering could also include storing such data packets in a buffer, or other storage area, or otherwise separating or segregating these types of data packets, where they could be subsequently analyzed in connection with trying to identify the source of a potential attempted attack, where a hacker tries to gain access to management control functions of a router. This operation of the ASIC 117 and CAM-ACL 118 prevents any host connected to a layer 2 subnet which is connected to a port of the router 101, other than port 102, from gaining access to the management functions provided by the CPU 116 of the router 101. Because the ASIC 117 and CAM-ACL 118, does this filtering operation, the CPU 116 of the router 101 does not need to divert any processing power to analyzing data packets which are received on ports of the router 101 which are not included in the MVLAN 104, and to then determine whether the host sending the data packet is authorized to access the management functions of the CPU 116.

As shown by the above discussion in order for a host to gain access to the management control functions of the CPU 116, the host must generate and transmit management data packets, where such packets are ones which are directed to an IP address which corresponds to the gateway IP address for the management port, and where such packets are in a management VLAN.

Figure 1:
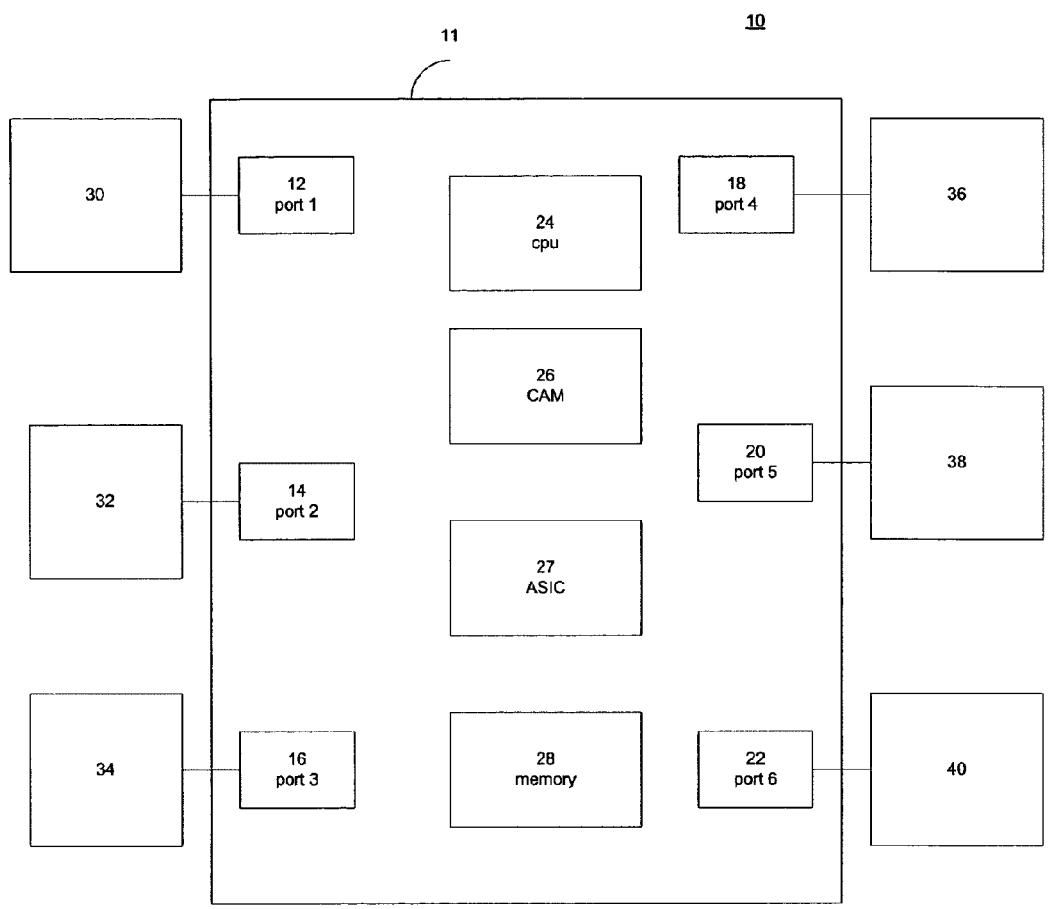
FIG. 1 shows an overview of a system of the prior art.

This operation of the router 101 offers significant advantages over the prior system of FIG. 1, in that the CAM-ACL 118, which is utilized by the ASIC 117, is easily configured to provide for efficient filtering which drops data packets attempting to access management control function of the CPU 116. Further, improved security is provided in that only those hosts which are included in the MVLAN will have access to the management control functions, and the CPU 116 is not responsible for filtering all data packets directed to the management control functions of the CPU 116. It should also be noted that although FIG. 2 shows a single CAM-ACL 118 and ASIC 117, multiple CAM-ACLs and ASICs could be provided, where each CAM-ACL and ASIC could monitor data packets on the different ports. Also, although not shown in FIG. 2 each port would in most systems be connected to corresponding subnets, in manner similar to that shown in FIG. 1.

An example of the operation of an embodiment herein helps to illustrate an embodiment of a method of the system. Consider a situation where the host 132 tries to send a data packet to the gateway address of the MVLAN. In the embodiment shown in FIG. 2 access to the control functions of the CPU is only provided through an IP address which corresponds to the gateway address (192.168.100.254/24) of port 102. Thus in order for host 132 to attempt to gain access the control functions of the CPU 116, it would have to generate data packets having a destination IP address which corresponds to this gateway address. Further, this data packet would need to utilize one of the management protocols in order to gain access to the management functions of the router 101. This data packet would be transmitted from the host 132 through the subnet/switch 124 to the port 114. The CAM-ACL 118 and ASIC 117 would then determine that the data packet was directed to the gateway address for the MVLAN, and would determine that the data packet utilized one of the management protocols. In response to determining that the data packet was directed to the gateway address of the MVLAN and that the data packet was in one of the management information protocols, the ASIC 117 would drop the data packet. Thus, the operation of the ASIC and CAM-ACL prevents the CPU from having to divert the processing power to protecting against potential hacker attacks coming from any of the non-MVLAN ports. The end result of this operation is that all devices connected to any port of the router 101 other than the defined management port 102, would be denied access to the management functions of the CPU 116 of the router 101.

Further, the operation provides if the host 132 was to try and gain access to the management control of the subnet/switch 124. The ASIC 117 would again prevent access. Specifically, if a host, such as the host 132, were to direct a management control data packet to the IP address of 126, which has an IP corresponding to the MVLAN gateway address, for example it might be 192.168.100.1, then the host 132 would generate a data packet having a destination address of 192.168.100.1. The subnet/switch 124 would recognize that this was not an IP address corresponding to the gateway 192.168.10.254, and would route the data packet to the port 114. At port 114 the ASIC 117 and CAM-ACL 118 would recognize that the data packet was directed to an IP address corresponding to the MVLAN and that it was utilizing one of the management protocols and would drop the data packet. Thus, the host 132 would be denied access to the management function of the subnet/switch 124.

In contrast where a host, such as host 129, is connected to the MVLAN subnet 128 and it generates a data packet with is directed to 126, this data packet will be received on port 102. The ASIC 117 and CAM-ACL 118 apply different rules to data packets received on the MVLAN 104 port 102. Assuming that management protocol data packet is received from a host on the subnet 128, then the data packet will reach the CPU 116 and can gain access to management function of the router 101. The CPU 116 could of course provide for additional levels protection for management controls. Assuming that the CPU grants management functions to the host on the subnet 128 and the host directs functional instruction to the plane 126, then the management function of the CPU 116 will generate data packets with the instructions to plane 126 of IP address 198.168.100.1 and these data packets will be transmitted through the port 114 to 126, where the instructions will be implemented by the switch 124.

The CPU 116 also operates to provide for prioritization of data packet routed through the router 101. For example, assume that the host 129 access the management functions of the CPU 116. The router operates to prioritize the data packets coming from the host 129 and give these management control data packets highest priority relative to other data packets being routed through the router 101. Line 134 represents a situation where a host on the control subnet 128 has accessed control functions of the CPU 116 and is sending management control instructions to the switch 124. These management control instructions would be routed as directly as possible with the highest priority through the router 101.

This operation of prioritizing data packets with management control instructions could be implemented in a number of different ways. One embodiment could provide that when policies for CPU Protection against remote access are configured through the CPU 116, and the protection rules are stored in the CAM, and/or a Parameter RAM (PRAM)

memory could also be utilized, prioritization rules could also be stored. During actual operation the ASIC will look up the source IP and destination IP addresses (this could be done by referring to information in the CAM ACL for example) where these IP addresses are identified as part of the management VLAN, then the ASIC operates to route the corresponding management control instructions with the highest priority.

Figure 3:
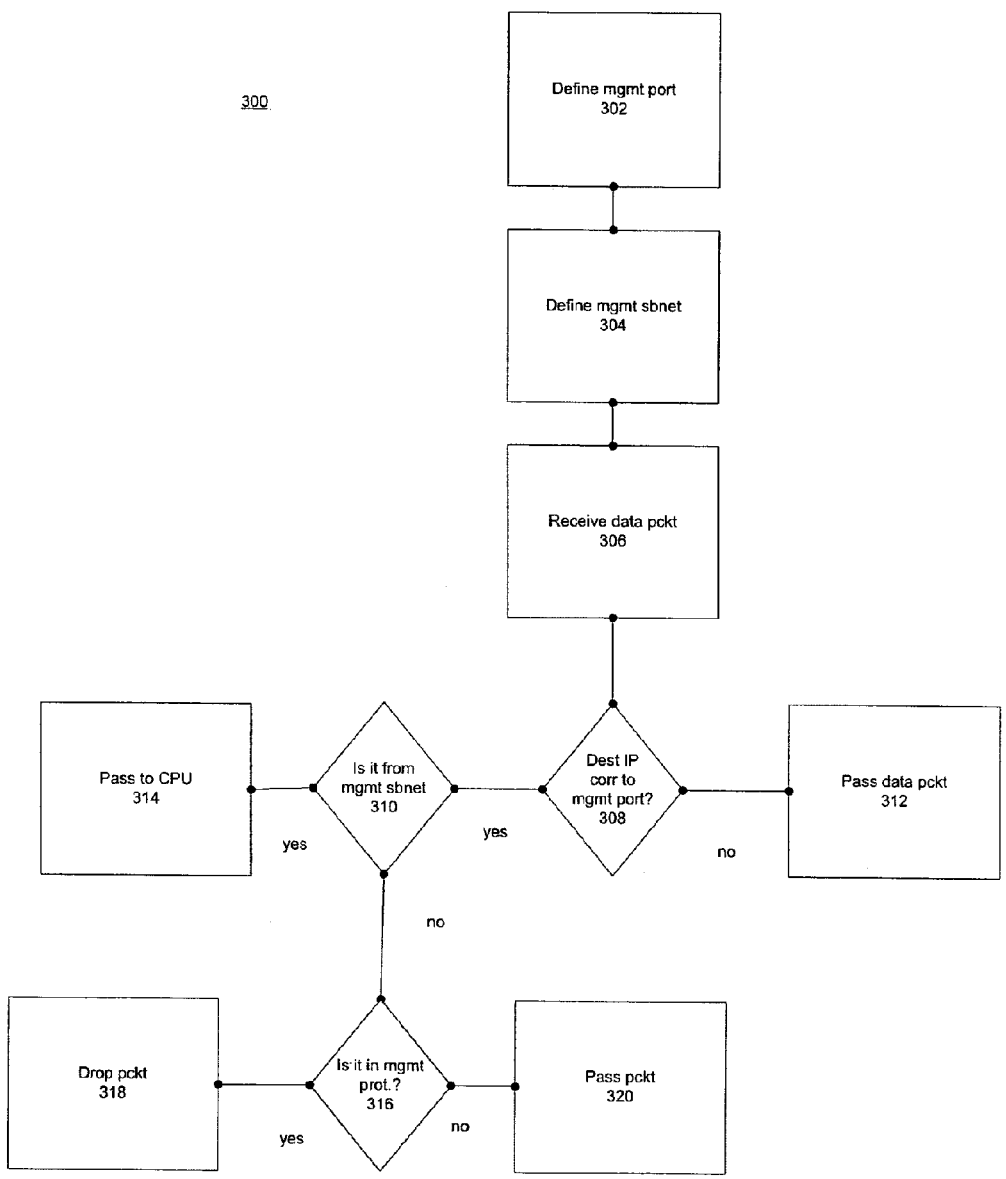
FIG. 3 shows a method of an embodiment of the present invention.

FIG. 3 shows a method 300 of an embodiment of the invention. At 302 a management port is defined. This can include creating a management virtual local area network as described above. A management subnet is defined at 304. The management subnet can be part of the management VLAN as described above. Additionally, management VLAN planes can be defined in layer 2 switches of other subnets of the system, as describe above. In operation of the system, data packets are received on ports of the router at 306. The received data packets are then analyzed 308 to determine if they include a destination IP address which correspond to the management address. If the received data packet does not have a destination IP address which corresponds to the management address then the data packet will be passed 312 to according to the destination IP address in the data packet. If the received data packet has a destination IP address which corresponds to the management address, then the received data packet is analyzed 310 to determine if it was received from the management subnet. If it was received from the management subnet then the data packet can be passed 314 to the CPU. If the data packet was not received from the management subnet, then the data packet is analyzed 316 to determine if it utilizes a management protocol. If it is in a management protocol, then the data packet is dropped 318. If the data packet is not in a management data protocol, then the data packet is passed 320.

Some aspects related to implementation and additional embodiments herein are shown in more detail below. In connection with configuring a layer 2 switch of a subnet for remote access as part of the MVLAN, a user can assign specific ports of a layer 2 switch of the management subnet as being part of the MVLAN. Thus, instead of defining a host IP address and protocol, and rules to be applied by a CPU, certain ports can be defined to have access to the CPU of the router. The below syntax shows code which defines a VLAN to include ports 1-5 on a third blade of layer 2 switch, and shows the IP address and subnet mask for the management access gateway.

```
vlan 3 by port
 untagged ethe 3/1 to 3/5
 !
 !
 ip address 10.10.11.1 255.255.255.0
 telnet access 10 vlan 3
 !
 access-list 10 deny 10.10.11.0 0.0.0.255.
```

In addition to configuring the layer 2 switches of the system, the layer 3 router can also be configured by the user in connection with controlling remote access to the CPU. The IP address specified in the router-interface will become the management IP address of the MVLAN. The below syntax shows an example of code which could be used in connection with configuring the router.

| | |
|---|---|
| vlan 3 by port | This text defines the |
| untagged ethe 3/1 to 3/5 | MVLAN and management |
| router-interface ve 3 | port and the IP address |
| ! | for the management port |
| interface ve 3 | and the subnet mask. |
| ip address 10.10.11.1 255.255.255.0 | |
| access-list 10 permit host 10.10.11.254 | This text identifies different |
| access-list 10 permit host 192.168.2.254 | host as having access, |
| access-list 10 permit host 192.168.12.254 | and denies any other hosts |
| access-list 10 permit host 192.64.22.254 | from having access |
| access-list 10 deny any | |
| telnet access-group 10 vlan 3 | This text defines and refers |
| ssh access-group 10 vlan 3 | to rules for different |
| web access-group 10 vlan 3 | management protocols. |
| snmp-server community private rw 10 vlan 3 | |

The table below shows a table from a CAM with rules which are applied to a port of the router which is defined as management port. The table shows that if any source IP address for received data packet is something other than one of the source IP address which is identified as permitted for management access, then if the datapacket is in the telnet protocol "23" and the data packet has a destination IP address corresponding to the management port then the data packet will be discarded. Similar implementation could be provided for other management protocols.

Router(config)#show cam 14 3/1

| Sl Index | Src IP__Addr | SPort | Dest IP__Addr | DPort | Prot | Age | Out Port |
|---|---|---|---|---|---|---|---|
| 3 40960 | 192.64.22.254/32 | Any | 10.10.11.1/24 | 23 | TCP | dis | Use L2/L3 |
| 3 40962 | 192.168.12.254/32 | Any | 10.10.11.1/24 | 23 | TCP | dis | Use L2/L3 |
| 3 40964 | 192.168.2.254/32 | Any | 10.10.11.1/24 | 23 | TCP | dis | Use L2/L3 |
| 3 40966 | 10.10.11.254/32 | Any | 10.10.11.1/24 | 23 | TCP | dis | Use L2/L3 |
| 3 40968 | Any | Any | 10.10.11.1/24 | 23 | TCP | dis | Discard |

The below text shows code syntax of an embodiment of the invention where management protocol data packets directed to the IP address of the management port are disabled for hosts connected non-management ports of the router. Specifically, a user can control management access to interfaces by disabling the management IP through the CAM, and although this feature allow users to choose which interface IP is not management IP, it does not affect any L3 routing for that interface.

| | |
|---|---|
| global-protocol-vlan | This text relates to defining the |
| ! | VLAN and defining the |
| ! | management port interface |
| vlan 1 name DEFAULT-VLAN by port | 3/10 and assigning the |
| ! | management IP |
| ! | address 10.10.10.1. |
| ! | |
| router ospf | |
| area 0 | |
| ! | |
| interface ethernet 3/10 | |
| ip address 10.10.10.1 255.255.255.0 | |
| ip ospf area 0 | |

-continued

| | |
|---|---|
| interface ethernet 3/11<br>ip address 11.11.11.1 255.255.255.0<br>ip ospf area 0<br>management-ip-disable<br>!<br>interface ethernet 3/12<br>ip address 12.12.12.1 255.255.255.0<br>ip ospf area 0<br>management-ip-disable<br>!<br>interface ethernet 3/13<br>ip address 13.13.13.1 255.255.255.0<br>ip ospf area 0<br>management-ip-disable | This text shows that the ports 3/11, 3/12, and 3/13 are disabled for management access. |

The table below shows a table from the CAM with rules which are applied to a port of the router which corresponds to the interface 3/11 which is shown above as having the management—ip disable. The table shows that regardless of the source ip address of a data packet, if the destination address corresponds to the management port, and the data packet is one of the management protocols, then the data packet will be discarded.

Router(config)#show cam 14 3/11

| Sl Index | Src IP_Addr | SPort | Dest IP_Addr | DPort | Prot Age | Out Port |
|---|---|---|---|---|---|---|
| 3 40960 | Any | Any | 11.11.11.1/24 | 23 | TCP dis | Discard |
| 3 40962 | Any | Any | 11.11.11.1/24 | 80 | TCP dis | Discard |
| 3 40964 | Any | Any | 11.11.11.1/24 | 1812 | TCP dis | Discard |
| 3 40966 | Any | Any | 11.11.11.1/24 | 49 | TCP dis | Discard |
| 3 40968 | Any | Any | 11.11.11.1/24 | 22 | TCP dis | Discard |
| 3 40970 | Any | Any | 12.12.12.1/24 | 23 | TCP dis | Discard |
| 3 40972 | Any | Any | 12.12.12.1/24 | 80 | TCP dis | Discard |
| 3 40974 | Any | Any | 12.12.12.1/24 | 1812 | TCP dis | Discard |
| 3 40976 | Any | Any | 12.12.12.1/24 | 49 | TCP dis | Discard |
| 3 40978 | Any | Any | 12.12.12.1/24 | 22 | TCP dis | Discard |
| 3 43520 | Any | Any | 11.11.11.1/24 | 161 | UDP dis | Discard |
| 3 43522 | Any | Any | 11.11.11.1/24 | 69 | UDP dis | Discard |
| 3 43524 | Any | Any | 11.11.11.1/24 | 49 | UDP dis | Discard |
| 3 43526 | Any | Any | 12.12.12.1/24 | 161 | UDP dis | Discard |
| 3 43528 | Any | Any | 12.12.12.1/24 | 69 | UDP dis | Discard |
| 3 43530 | Any | Any | 12.12.12.1/24 | 49 | UDP dis | Discard |

It should be noted that the above syntax related to potential software code of different embodiments should be viewed as illustrative, and one of skill in the art would recognize that specific implementations of the invention herein could be implemented in different ways. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A network device comprising:
a plurality of ports including a first port and a second port; and
means for filtering a data packet received at the second port if:
the network device determines that the data packet is destined for the first port,
the network device determines that the data packet is a management data packet, and
the network device determines that the data packet originated from a VLAN other than a management VLAN that includes the first port.

2. The network device of claim 1 where the data packet is destined for the first port if the data packet includes a destination IP address corresponding to a gateway IP address of the first port.

3. The network device of claim 1 wherein the first port is defined as a management port for the network device and wherein the second port is defined as a non-management port for the network device.

4. The network device of claim 1 wherein the data packet is a management data packet if the data packet uses a management protocol.

5. The network device of claim 4 wherein the management protocol is selected from a group consisting of: Telnet, SSH, SNMP, and TFTP.

6. The network device of claim 1 wherein the first port is part of a management virtual local area network (VLAN).

7. The network device of claim 6 wherein the second port is not part of the management VLAN.

8. The network device of claim 1 wherein filtering the data packet comprises dropping the data packet.

9. The network device of claim 1 wherein filtering the data packet comprises storing the data packet without forwarding the data packet to the first port.

10. A network device comprising:
a management port;
a non-management port; and
means for filtering management data packets received at the non-management port, wherein the filtering comprises:
determining if a destination IP address included in a management data packet received at the non-management port corresponds to a gateway address of the management port; and
if the destination IP address included in the management data packet corresponds to the gateway address of the management port, determining if the data packet originated from a management VLAN that includes the management port.

11. The network device of claim 10 wherein the filtering further comprises:
if the data packet did not originate from the management VLAN, dropping the data packet.

12. A network device comprising:
a plurality of ports including a first port and a second port,
wherein the network device filters a data packet received at the second port if:
the network device determines that the data packet is destined for the first port,
the network device determines that the data packet is a management data packet, and
the network device determines that the data packet originated from a VLAN other than a management VLAN that includes the first port.

13. A network device comprising:
a management port and a non-management port,
wherein the network device filters management data packets received at the non-management port by:
determining if a destination IP address included in a management data packet received at the non-management port corresponds to a gateway address of the management port; and if the destination IP address included in the management data packet corresponds to the gateway address of the management port, determining if the data packet originated from a management VLAN that includes the management port.

14. A method comprising:

filtering, by a network device, a data packet received at a non-management port of the network device if:
  the network device determines that the data packet is destined for a first port of the network device,
  the network device determines that the data packet is a management data packet, and
  the network device determines that the data packet originated from a VLAN other than a management VLAN that includes the first port.

15. A non-transitory computer readable medium having stored thereon instructions executable by a processor, the instructions including:

instructions that cause the processor to filter a data packet received at a non-management port of the network device if:
  the processor determines that the data packet is destined for a first port of the network device,
  the processor determines that the data packet is a management data packet, and
  the processor determines that the data packet originated from a VLAN other than a management VLAN that includes the first port.

\* \* \* \* \*